(12) United States Patent
Muylaert

(10) Patent No.: US 6,213,712 B1
(45) Date of Patent: Apr. 10, 2001

(54) HELICOPTER BLADE POSITIONING MECHANISM FOR FOLDABLE ROTOR BLADES

(75) Inventor: Neal W. Muylaert, Apache Junction, AZ (US)

(73) Assignee: McDonnell Douglas Corporation, Mesa, AZ (US)

( * ) Notice: Subject to any disclaimer, the term of this patent is extended or adjusted under 35 U.S.C. 154(b) by 0 days.

(21) Appl. No.: 09/454,130

(22) Filed: Dec. 3, 1999

(51) Int. Cl.⁷ .............................. B64C 11/28; B64C 27/50
(52) U.S. Cl. .................. 416/1; 416/61; 416/142; 416/143
(58) Field of Search .................. 416/1, 61, 142, 416/143

(56) References Cited

U.S. PATENT DOCUMENTS

| 4,268,222 | * | 5/1981 | Bernard | 416/1 |
| 4,738,592 | * | 4/1988 | Cavanaugh | 416/143 |

* cited by examiner

Primary Examiner—Christopher Verdier
(74) Attorney, Agent, or Firm—Stout, Uxa, Buyan & Mullins, LLP; Donald E. Stout

(57) ABSTRACT

An improved blade positioning mechanism for folding a helicopter blade attached to a pitch control housing permits a controlled folding of the main rotor blade for increased safety and decreased risk of damage to the helicopter or other equipment. The invention also folds the main rotor blade while the blade remains attached to the pitch control housing, thus eliminating the need to rebalance the blade. In an embodiment of the invention blade positioning mechanism comprises a pitch control housing connection, a rotor blade clamp, and a clamp positioner. The pitch control housing connection is adapted to temporarily attach to the pitch control housing of the helicopter and pivot with two degrees of freedom relative to the pitch control housing. The rotor blade clamp is adapted to temporarily attach to the rotor blade of the helicopter. The clamp positioner is attached to the rotor blade clamp and the pitch control housing connection. The positioner is adapted to pivot with two degrees of freedom relative to the rotor blade clamp. Further, once all but one of the blade retention pins that attach the blade to the pitch control housing has been removed, the positioner is adapted to position the rotor blade clamp a distance from the pitch control housing connection, whereby the rotor blade pivots about the remaining pin.

19 Claims, 5 Drawing Sheets

HELICOPTER BLADE POSITIONING MECHANISM FOR FOLDABLE ROTOR BLADES

BACKGROUND OF THE INVENTION

1. Field of the Invention

This invention relates to helicopters and, more specifically, to folding the blades of the helicopter.

2. Description of the Related Art

While the flight capabilities of helicopters makes them effective vehicles for a wide variety of flight missions, the utility of helicopters in certain circumstances may be limited by the overall structural envelopes thereof. To provide the power required to support the flight capabilities of helicopters, the main rotor assemblies of helicopters, incorporate a plurality of main rotor blades having large radial dimensions. The large radial dimensions of helicopter rotor assemblies results in helicopters having large structural envelopes that occupy an inordinate amount of space. The large structural envelopes of helicopters may limit their utility in some circumstances.

For example, helicopters utilized for maritime flight operations may be required to conduct operations from ships for extended periods of time. Shipboard space is generally at a premium, and the large structural envelopes of helicopters means that stowage of helicopters during periods of non-use requires a large allocation of such limited space. The same concern arises for helicopters operating from oceanic oil rigs wherein helicopters are stowed during periods of non-use. In addition to space limitations arising from the structural envelopes of helicopters due to the main rotor assemblies, the main rotor assemblies of stowed helicopters that are exposed to the environment are vulnerable to wind gusts. Furthermore, strategic and tactical considerations in the military utilization of helicopters has led to a requirement for helicopters having main rotor assemblies that may be readily reconfigured for rapid deployment, routine transport, and/or stowage through reduction in the structural envelopes of the helicopters.

Several options are available to reduce the structural envelopes of helicopters to facilitate rapid deployment, routine transport, stowage, and/or to reduce the vulnerability thereof to environmental conditions. One option is to design the main rotor assemblies of helicopters so that the main rotor blades may be removed from the rotor hub assembly. While this is a viable solution in some circumstances, it should be appreciated that such main rotor blade assemblies may be unnecessarily complex. In addition, it should be appreciated that removal of the main rotor blades tends to be time consuming and labor intensive. Moreover, these same time constraints and labor requirements exist when the helicopter is reconfigured for subsequent flight operations. Further, removal of the main rotor blades may require rebalancing of the blades upon reattachment. Therefore, reduction of the structural envelope of helicopters by removal of the main rotor blades may not be the most viable option under some circumstances.

Another option available to reduce the structural envelopes of helicopters is to design the main rotor assemblies thereof so that the main rotor blades may be folded about the main rotor hub assembly. Main rotor blade folding operations may be implemented either automatically via hydraulic systems or manually. Automatically controlled blade folding operations require relatively extensive modifications to the main rotor assembly to incorporate the necessary mechanical apparatus to effectuate automatic blade folding. In addition, specialized software must be incorporated in the automatic flight control system to regulate automatic blade folding operations. Representative examples of such mechanical apparatus and specialized software are illustrated in U.S. Pat. Nos. 4,354,234, 4,284,387, and 3,743,441. Such mechanical apparatus unnecessarily increase the complexity of the main rotor assembly. In addition, such mechanical apparatus and software increases the overall system cost of the helicopter.

Manual blade folding operations, in contrast, generally require minimal mechanical modifications to the main rotor assembly, and do not generally require specialized software. In light of the minimal mechanical modifications required to incorporate blade folding capabilities in helicopter main rotor assemblies, this option represents a viable approach in a number of circumstances. For example, for maritime operations and oil rig use, manual blade folding operations may be effected with minimal manpower in a short period of time to reduce the overall structural envelope of helicopters. The modifications to the main rotor assembly required to accommodate manual blade folding operations result in only an incremental increase in the complexity of the main rotor assembly and the overall systems costs of the helicopter.

However, manual blade folding operations do pose a concern in terms of the pitch actuation system of the helicopter. The helicopter pitch actuation system is a relatively complex hydromechanical system comprised of a large number of precisely aligned, structurally and functionally interrelated components. Such components include the pilot's input (collective; cyclic), interconnecting mechanical linkages, hydraulic servo systems, a swashplate assembly (stationary; rotating), pitch control rods, and pitch control horns. It goes without saying that proper operation of the pitch actuation system is vital to safe and efficient helicopter flight operations. Proper operation of the pitch actuation system, in turn, requires precise alignment and functional interactions among the various elements of the hydromechanical system. Pilot inputs via the collective and cyclic controls must be accurately and systematically converted to repeatable pitch inputs to the main rotor blades via the pitch actuation system.

During blade folding operations, however, displacements may be induced into the main rotor blades being folded by wind gusts, loss of physical blade control, etc. Such displacements may be coupled into the pitch actuation system by means of the respective pitch control horns. Such coupled displacements may damage or degrade the pitch actuation system by disrupting the precise alignment and/or functional interactions among the various components of the hydromechanical pitch actuation system, thereby negatively impacting the accuracy and repeatability of the pitch actuation system. Increasing the concern vis-a-vis damage or degradation of the flight actuation system is the fact that such damage or degradation may occur to components of the hydromechanical system that are located within the helicopter fuselage, and as such, not readily visible during preflight checks prior to commencing flight operations.

Further, the main rotors blades are essentially air foils that during a manual folding operation may be hard to control by the personnel folding the blades. An example of main rotor blade has a center of gravity about 10 feet out from the hub and weighs approximately 170 pounds. Prior art discloses the use of a pole that is attached to the rotor blade tip such that a person may use the pole to guide the tip during the folding process.

SUMMARY

An improved blade positioning mechanism for folding a helicopter blade attached to a pitch control housing has been discovered. The invention permits a controlled folding of the main rotor blade for increased safety and decreased risk of damage to the helicopter or other equipment. The invention also folds the main rotor blade while the blade remains attached to the pitch control housing, thus eliminating the need to rebalance the blade.

In an aspect of the invention, the blade positioning mechanism comprises a pitch control housing connection, a rotor blade clamp, and a clamp positioner. The pitch control housing connection is adapted to temporarily attach to the pitch control housing of the helicopter and pivot with two degrees of freedom relative to the pitch control housing. The rotor blade clamp is adapted to temporarily attach to the rotor blade of the helicopter. The clamp positioner is attached to the rotor blade clamp and the pitch control housing connection. The positioner is adapted to pivot with two degrees of freedom relative to the rotor blade clamp. Further, once all but one of the blade retention pins that attach the blade to the pitch control housing has been removed, the positioner is adapted to position the rotor blade clamp a distance from the pitch control housing connection, whereby the rotor blade pivots about the remaining pin.

In a further aspect of the invention, clamp positioner comprises a threaded stud and a female knuckle engaged with the threaded stud. The threaded stud has an end rotatably attached to the pitch control housing connection such that the threaded stud is rotatable about its axis. The female knuckle is attached to the rotor blade clamp such that the rotor blade clamp moves relative to the threaded stud end upon rotation of the threaded stud. In a still further aspect of the invention, the threaded stud end of the clamp positioner is adapted to engage a device for rotating the threaded stud.

In a further aspect of the invention, the clamp positioner comprises a pivotal element and a removable pin. The pivotal element is rotatably attached to the female knuckle and adapted to pivot in an axis other than an axis of the threaded stud. The removable pin is adapted to pivotally secure the rotor blade clamp to the pivotal element and to enable the rotor blade clamp to pivot about an axis other than the pivotal element axis, whereby the rotor blade clamp pivots with two degrees of freedom relative to the threaded stud.

In an aspect of the invention, the pitch control housing connection comprises a spindle and a connection fitting. The spindle is adapted to pivotally attach to a member extending from the pitch control housing and pivot in a spindle axis. The connection fitting is pivotally attached to the spindle and adapted to pivot about a fitting axis that is different than the spindle axis, whereby the pitch control housing connection pivots with two degrees of freedom relative to the pitch control housing.

In a still further aspect of the invention, the pitch control housing connection further comprises a bearing housing attached to the connection fitting and adapted to have at least a portion of the clamp positioner rotate therein.

In a further aspect of the invention, the rotor blade clamp comprises a first member pivotally attached to a second member and adapted such that the rotor blade is disposed between the first and second members when the rotor blade clamp is attached to the rotor blade.

In a still further aspect of the invention, the first and second members are adapted to be temporarily statically secured together. In a still further aspect of the invention, the first and second members each have a hole adapted to be aligned and accept a clamp pin whereby the first and second member are temporarily statically secured together.

In an aspect of the invention, a blade folding assembly for folding a helicopter blade attached to a pitch control housing with first and second pins has been discovered. The assembly comprises a clamping means, a positioning means, and an attaching means. The clamping means removably couples the assembly to the blade. The positioning means controllably pivots the blade about the first pin when the second pin is removed. The positioning means is also attached to the clamping means. The attaching means removably couples the said blade folding assembly to the pitch control housing and is attached to said positioning means.

In a further aspect of the invention, the clamping means further comprises a first pivoting means for enabling the clamping means to pivot about the positioning means with two degrees of freedom.

In a further aspect of the invention, the attaching means further comprises a second pivoting means for enabling the positioning means to pivot about the pitch control housing with two degrees of freedom.

In a further aspect of the invention, the positioning means further comprises a controlling means for controlling the position of the blade and the speed of pivoting the blade.

In a further aspect of the invention, the controlling means comprises a rotatable means for controlling the position of the blade and the speed of pivoting the blade with a hand tool or power tool.

In an aspect of the invention, a process for folding a helicopter rotor blade attached to a pitch control housing via first and second pins extending therethrough comprises a step of clamping a rotor blade clamp of a rotor blade positioning mechanism to the blade. Another step is to pivotally attach a pitch control housing connection of the rotor blade positioning mechanism to the pitch control housing. An additional step is to pivotally attach the rotor blade clamp to a clamp positioner of the rotor blade positioning mechanism. A further step is to remove the first pin. Then, the clamp positioner is adjusted such that the rotor blade clamp moves relative to the pitch control housing connection, whereby the rotor blade pivots about the second pin thereby folding the blade.

In a further aspect of the invention, there is a step of moving the pitch control housing connection with two degrees of freedom relative to the clamp positioner. There is also another step of moving the rotor blade clamp with two degrees of freedom relative to the clamp positioner.

In a further aspect of the invention, the adjusting the clamp positioner step further comprises the steps of rotating a threaded stud of the clamp positioner whereby a female knuckle engaged with threaded stud moves axially along the threaded stud. The female knuckle is in connection with and affecting movement of the rotor blade clamp relative to the pitch casing housing.

In another aspect of the invention, there is the step of readjusting the clamp positioner such that a hole in the blade realigns with a hole in the pitch control housing. Then the first pin is inserted through the aligned holes in the blade and the pitch control housing thereby fixedly resecuring the blade to the pitch control housing. After that, the rotor blade clamp and the pitch control housing mechanism is removed from the blade and the pitch control housing respectively.

In a further aspect of the invention, there is another step of attaching a pole to a tip of the blade. Next, the blade is supported with the pole as the blade pivots about the second pin.

DESCRIPTION OF THE PREFERRED EMBODIMENTS

Figure 1:
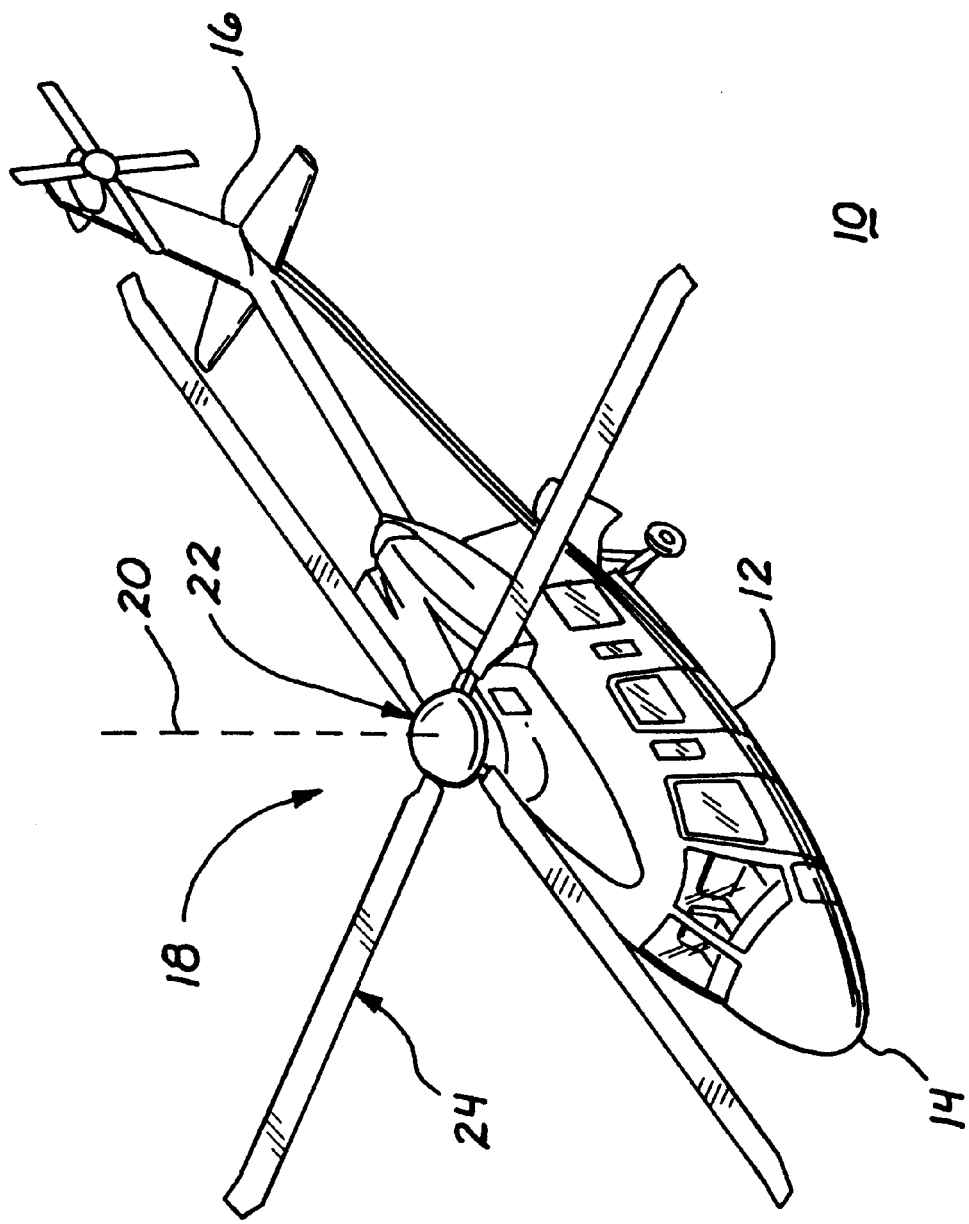
FIG. 1 is a perspective view of a helicopter.

Referring now to the drawings, wherein like reference characters designate identical or corresponding parts throughout the several views and embodiments, a helicopter 10 is comprised of a fuselage 12 which extends from a front end 14 to a tail section 16. A rotor assembly 18 extends out of the fuselage 12 and defines an axis of rotation 20. The main rotor assembly 18 includes an upper hub assembly 22. A plurality of main rotor blade assemblies 24 are coupled to the rotor assembly 18 and particularly the upper hub assembly 22.

Figure 2:
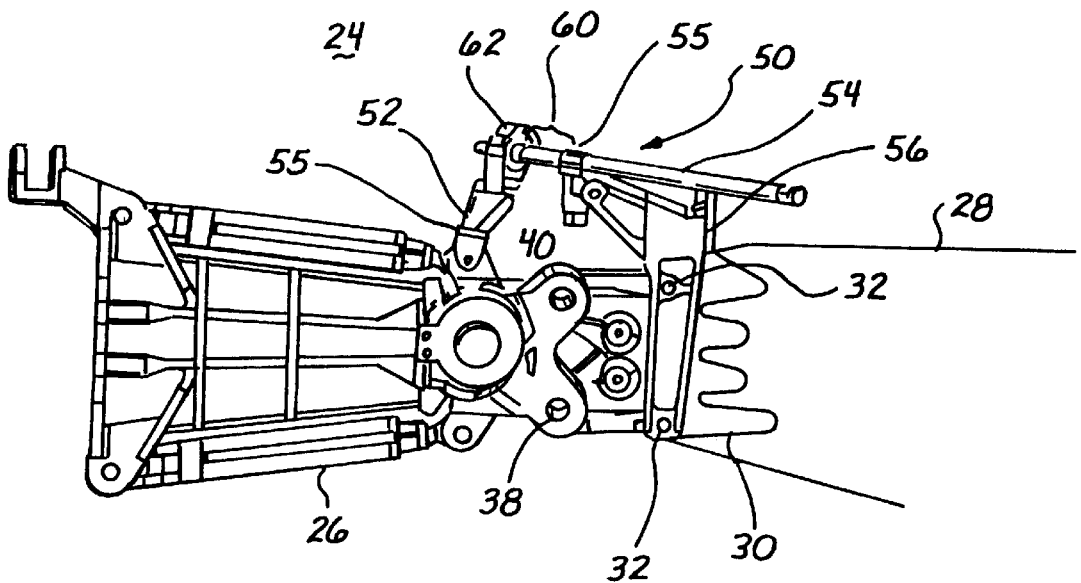
FIG. 2 is a detail view of the main rotor blade assembly with a blade positioning mechanism according to an embodiment of the invention attached with the blade in the fully attached or unfolded position.

Referring now, in particular, to FIG. 2, a main rotor blade assembly 24 with a blade positioning mechanism 50 attached. The blade assembly 24 comprises a pitch control housing 26 joined to a blade 28. More specifically, the blade 28 is held in a root end fitting 30 by two threaded studs 32. The root end fitting 30 also has two retention pin holes 34 (not shown—see FIG. 3) that are aligned with two retention pin holes 36 (not shown—see FIG. 3) of the pitch control housing 26 through which extend two retention pins 38, respectively. The retention pins 38 fixedly attach the root end fitting 30 of the blade 28 to the pitch control housing 26. It is understood that the root end fitting 30 is considered part of the blade 28, such that the blade 28 is fixedly attached to the pitch control housing 26.

As is known by those skilled in the art, after the blades 28 have been attached to the pitch control housing, or if one or more of the blades have been removed entirely and reattached, the main rotor assembly 18 would have to be rebalanced. In a preferred embodiment of the invention, the blade 28 is folded while one of the retention pins 38 continues to attach the blade 28 to the pitch control housing 26, thus removing the need to rebalance the assembly 18.

Continuing to refer to FIG. 2, a blade positioning mechanism 50 for folding the blade 28 is attached to the rotor blade assembly 24 with the blade in a fully attached or unfolded position. The mechanism 50 comprises a pitch control housing connection 52, a clamp positioner 54, and a rotor blade clamp 56. More specifically, a spindle 58 of the connection 52 is pivotally attached to a stud 40 that extends through the pitch control housing 26. Further, the clamp 56 holds the blade 28 by being bolted thereto via two studs 32 that hold the blade 28 in the root end fitting 30. Note that a female knuckle 55 of the clamp positioner 54 is a distance 60 from a bearing housing 62 of the pitch control housing connection 52.

Figure 3:
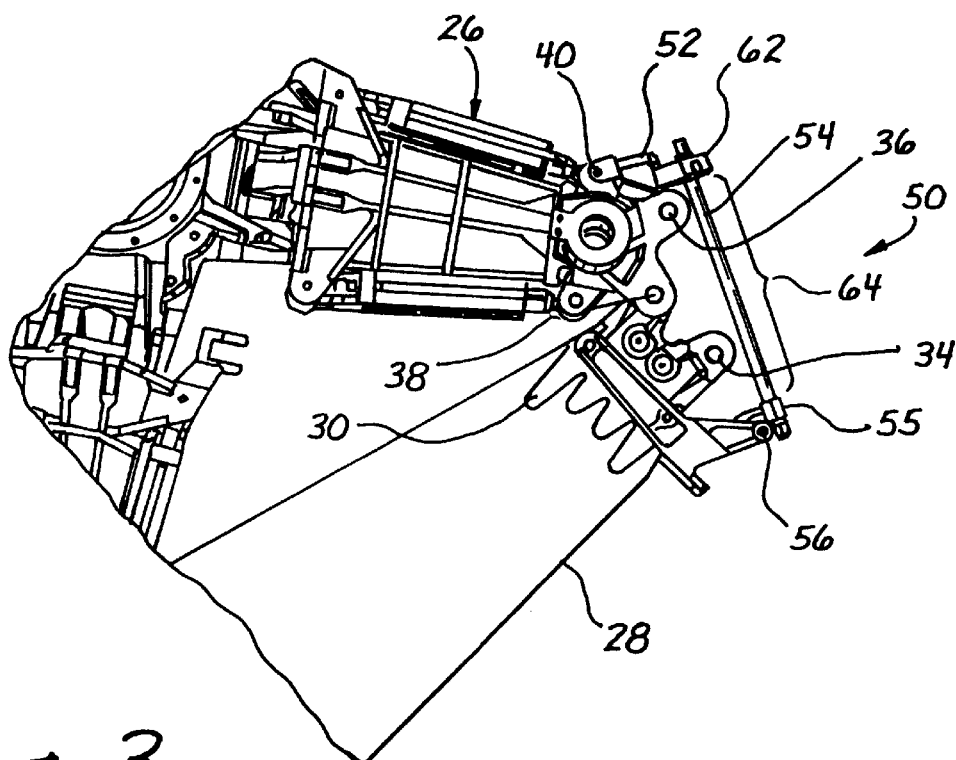
FIG. 3 is a detail view of the main rotor blade assembly with a blade positioning mechanism of FIG. 2 with the blade in the folded position.

Referring now to FIG. 3, the blade 28 is shown in the semi-attached or folded position. One of the retention pins (not shown) has been removed to allow the blade 28 to pivot about the remaining retention pin 38. This results in set of the retention holes 34 and 36 being unaligned. Also, the female knuckle 55 is a distance 64 from the bearing housing 62, and the distance 64 is greater than the distance 60 of the unfolded position of the blade 28 shown in FIG. 2.

Figure 4:
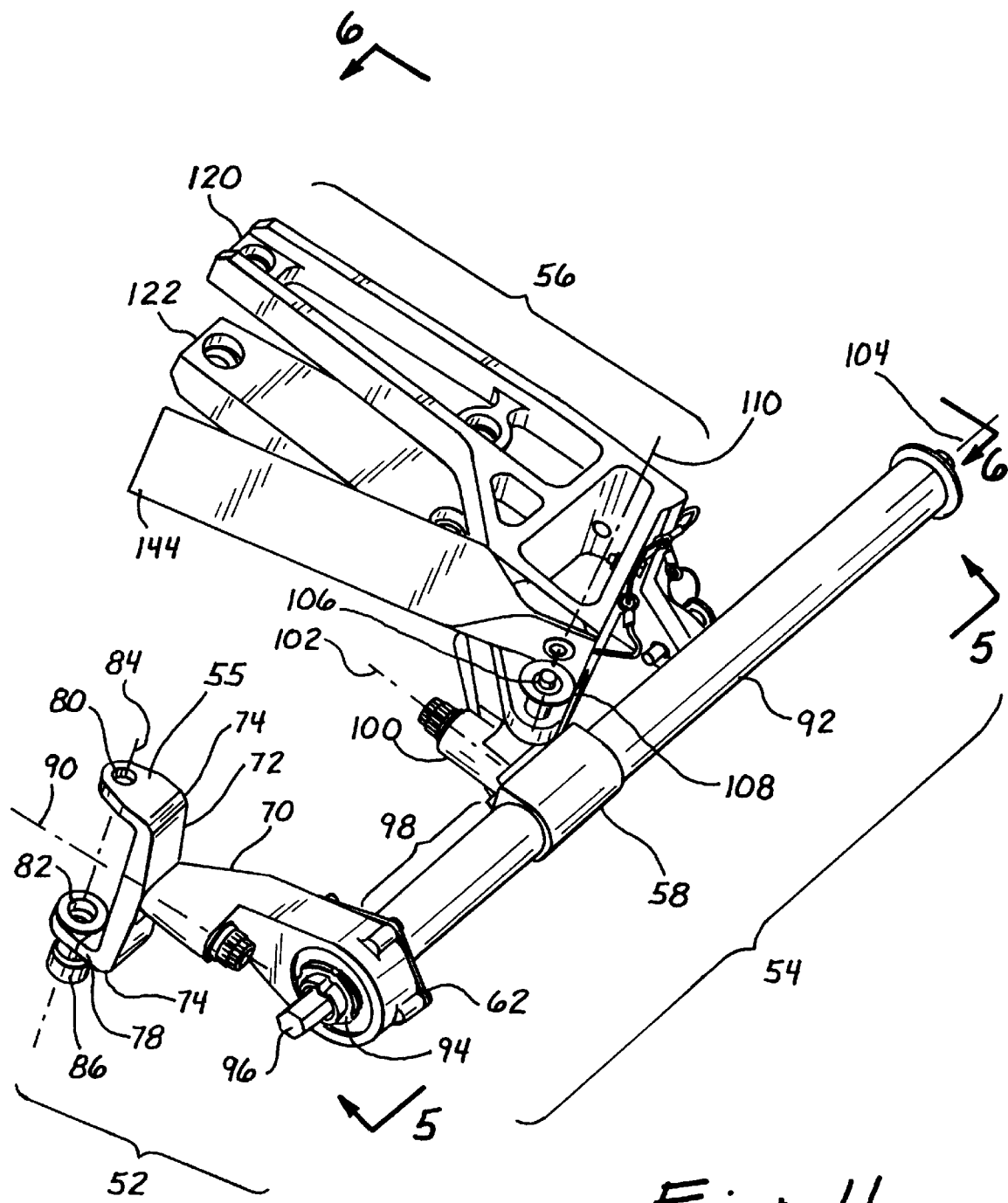
FIG. 4 is a perspective view the blade positioning mechanism shown in FIG. 2.
Figure 5:
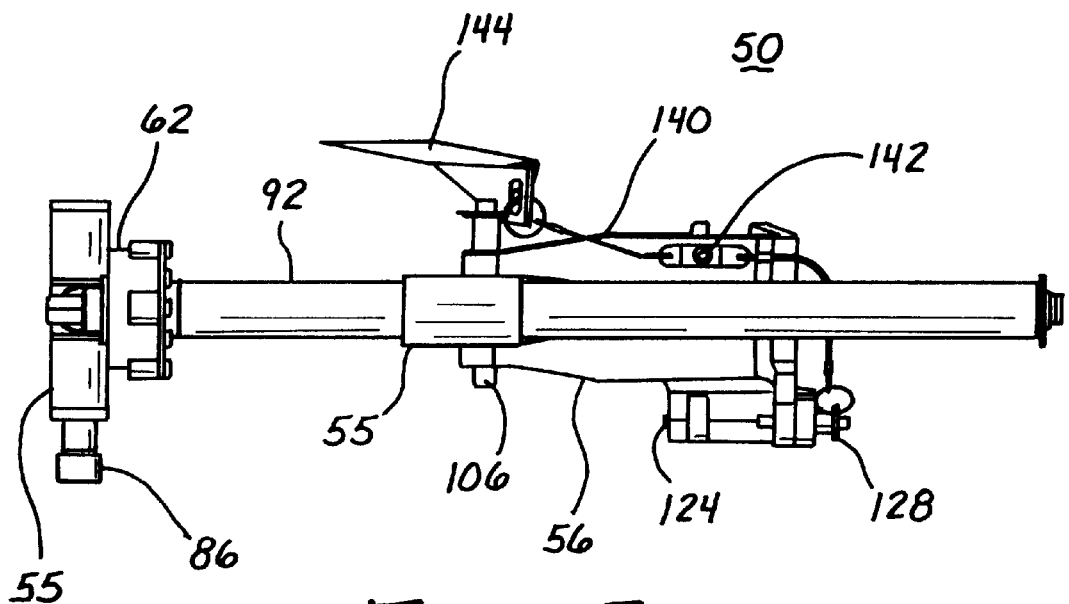
FIG. 5 is a view of the blade positioning mechanism along section 5—5 shown in FIG. 4.
Figure 6:
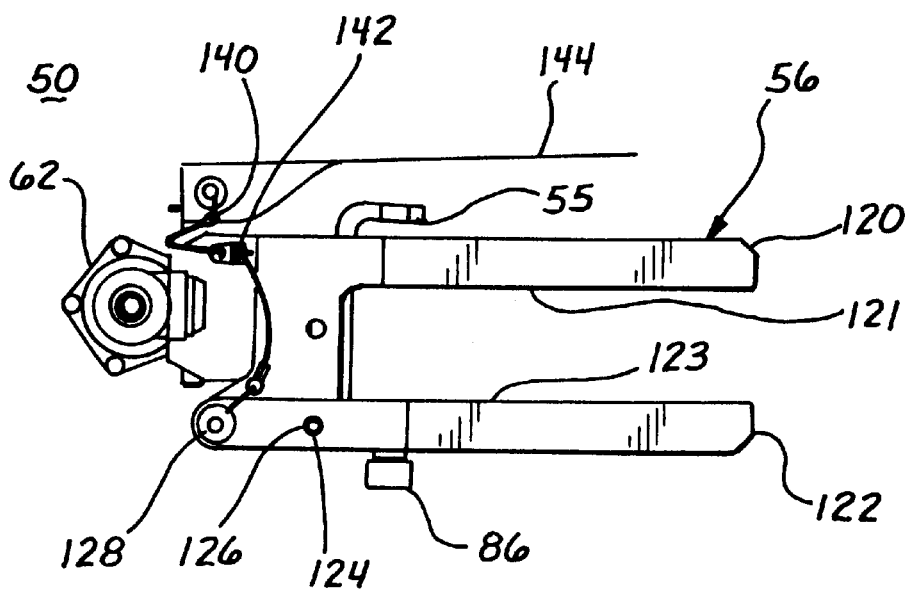
FIG. 6 is a view of the blade positioning mechanism along section 6—6 shown in FIG. 4.

Referring now to FIGS. 4–6, the blade positioning mechanism 50 is discussed in detail below. The pitch control housing connection 52 comprises the spindle 58, a connection fitting 70, and the bearing housing 62. The spindle 58 has a body 72 having opposing sides 74 from which extend members 76 and 78. The members 76 and 78 have holes 80 and 82 respectively that are aligned along a spindle axis 84. The spindles holes 80 and 82 are adapted to retain the stud 40 that extends through the pitch control housing 26 shown in FIGS. 2 and 3. Further, the spindle hole 82 is adapted to retain the stud 40 via a thumb screw 86. The arrangement of the spindle 58 and the stud 40 permits the spindle 58 to pivot about the spindle axis 84, providing one degree of freedom of the connection 52 to the pitch control housing 26.

The body 72 of the spindle 58 is rotationally attached to the connection fitting 70. The connection fitting 70 rotates about a fitting axis 90 that is normal to the spindle axis 84. The arrangement of the fitting 70 and the spindle 58 permits an additional degree of freedom that the pitch control housing connection 52 may move relative to the pitch control housing 26. Other embodiments of the invention have equivalent arrangements for providing two degrees of freedom of movement between the pitch control housing 26 and the pitch control housing connection 52.

Extending from the connection fitting 70 is the bearing housing 62. The bearing housing 62 in a preferred embodiment of the invention has double wall bearings (not shown). The bearing housing 62 is adapted to retain in a rotation arrangement a threaded stud 92 of the clamp positioner 54, as described below.

The clamp positioner 54 comprises the previously mentioned female knuckle 55 that is engaged with the threaded stud 92. The threaded stud 92 has an end 94 that extends through the bearing housing 62 and rotates therein. The end 94 terminates in a hex nut 96, preferably a ¾" hex nut, that is engagable with a hand tool, such as a wrench, or a power tool.

The threaded stud 92 and the female knuckle 55 are arranged such that rotating the threaded stud translates or moves the knuckle along the stud. The movement of the female knuckle 55 results in changing the distance 98 between the knuckle and the bearing housing 62. The change in distance 98 also changes the distance between the pitch control housing connection 52 and the rotor blade clamp 56. This results in the blade 28 pivoting to a more unfolded or folded position, as shown in FIGS. 2 and 3. Other embodiments of the invention have other suitable mechanisms for increasing or decreasing the distance 98.

Extending from the female knuckle 55 is a pivotal element 100 that is designed to pivot in an axis 102 that is normal to an axis 104 of the threaded stud 92. The pivotal element 100 also has a hole (not shown) through which extends a removable pin 106. The removable pin 106 also extends through aligned holes 108 extending through the rotor blade clamp 56. The arrangement of the removable pin 106, the pivotal element hole, and the aligned hole 108 permits the rotor blade clamp 56 to pivot about a pin axis 110 that is normal to the pivotal element axis 102. This arrangement permits the rotor blade clamp 56 to pivot in two degrees of freedom relative to the threaded stud 92.

The preferred embodiment of the invention has the two degrees of freedom between the pitch control housing 26 and the pitch control housing connection 52 and the two degrees of freedom between the rotor blade clamp 56 and the threaded stud 92 to insure that the folding and unfolding of the blade 28 progresses without the blade positioning mechanism 50 binding up. Other embodiments of the invention may have the degrees of freedom incorporated in other ways into the design of the mechanism 50.

Figure 7:
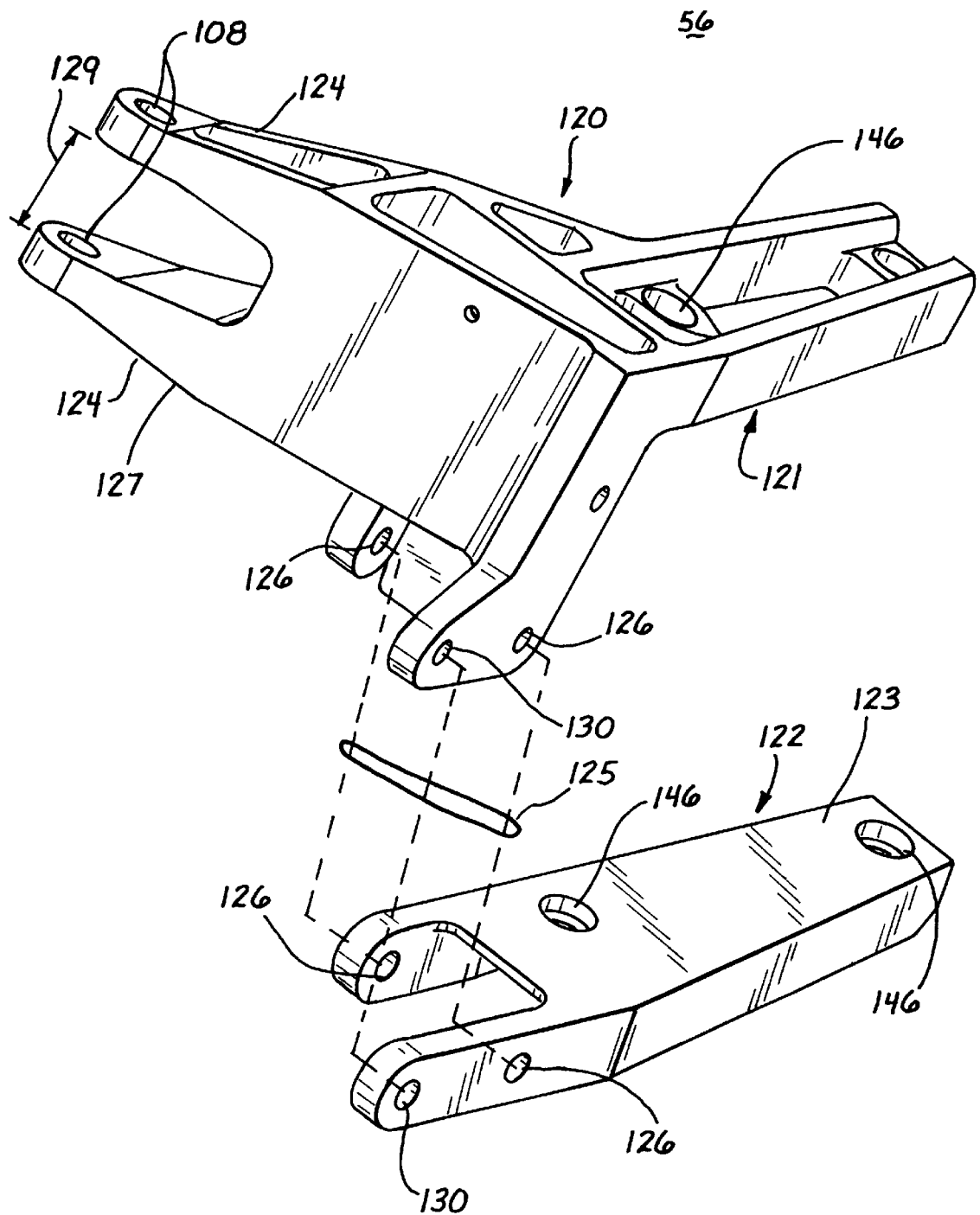
FIG. 7 is an exploded view of the rotor blade clamp of the blade positioning mechanism of FIG. 2.

Referring now to FIG. 7 as well, the rotor blade clamp 56 is comprised of a first clamp arm 120 and a second clamp arm 122. As previously discussed, the clamp 56 is pivotally attached to the clamp positioner 54 via a removable pin 106 that extends through the clamp positioner pivotal element 100 and holes 108 in the clamp. As is clearly shown in FIG. 7, the holes 108 are aligned and extend through elements 125 that extends from a forked element 127 of the first clamp arm 120. A gap 129 is such that the portion of the pivotal element 100 having the hole for the removal pin fits in the gap. Other embodiments of the invention have other arrangements for the pivotal connection between the clamp 56 and the positioner 54.

Referring now specifically to FIG. 6, the first and second clamp arms or members 120 and 122 are adapted to complement the portion of the blade that is to be disposed in the clamp 56. More specifically, an interior surface 121 of the first clamp arm 120 complements a surface of the blade and an interior surface 123 of the second clamp arm 122 complements an opposing surface of the blade. The arms 120 and 122 are rotational fixed to each other via a permanent clamp pin 124 that extends through aligned holes 126 in the clamps.

In the shown and preferred embodiment of the invention, the arms 120 and 122 may also be statically secured together via a removable pin 128. The arms 120 and 122 have holes 130 that are mutually alignable when the arms are in a specific relative position, as shown in FIG. 6. The removable pin 128 is then inserted through the aligned holes 130 and thereby statically securing the arms. It is desirable to have the arms 120 and 122 pivot relative to each other to assist in positioning the rotor blade clamp 56 about the blade 28. However, it is also desirable to statically secure the arms 120 and 122 such that they do not swing open and shut thereby creating a hazard.

The removable pin 106 that pivotally connects the clamp 56 to the clamp positioner 54 and the removable pin 128 that statically secures the arms 120 and 122 of the clamp are secured to the clamp via a tie wire 140 that is attached to the clamp with a fixture 142. The tie wire 140 also extends through a flag 144 that serves as an indication that the mechanism 50 is attached to the blade assembly 24.

The arms 120 and 122 also have two sets of aligned holes 146 that complement threaded studs 32 extending from the blade 28 and secure the clamp 56 to the blade. Other embodiments of the invention have other suitable arrangements for securing the clamp 56 to the blade 28. Still further embodiments of the invention do not use a clamp but use any suitable mechanism for securing the mechanism 50 to the blade 28.

In the preferred embodiment of the invention, the mechanism 50 is designed only to be secured to the blade assembly 24 during the folding and unfolding process, and not during operational use of the helicopter 10. Other embodiments of the invention are designed to remain permanently on the helicopter 10.

Other embodiments of the invention are designed for specific helicopters.

In an embodiment of the invention, the process for folding the blade 28 has a step of clamping the rotor blade clamp 56 to the blade and a step of securing the pitch control housing connection 52 to the pitch control housing. If the clamp 56 is not attached to the clamp positioner, it is also performed. Next, one of the two retention pins 38 is removed, thereby forming a pivotal relationship between the blade 28 and the pitch control housing 26 about the remaining retention pin 38. Next, the clamp positioner 54 is adjusted such that the clamp 56 moves relative to the pitch control housing connection 52 thereby folding the blade 28. Unfolding the blade occurs by reversing the steps.

In a preferred embodiment of the invention, the hex nut 96 is engaged with either a hand tool or a power tool, the thread stud 92 is rotated, and the female knuckle 55 moves in a controlled manner. By having the knuckle 58 move in a controlled manner, the movement of the blade 28 is controlled, thus inhibiting the blade moving unexpectantly and damaging itself or another item or injuring personnel. For a more controlled folding and unfolding of the blade 28, a rod (not shown) with a blade tip grasping element is attached to the blade tip and another person supports the blade tip as the blade is moved.

Although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention.

What is claimed is:

1. A blade positioning mechanism for folding a helicopter rotor blade attached to a pitch control housing via two blade pins, the mechanism comprising:

a. a pitch control housing connection adapted to temporarily attach to the pitch control housing and pivot with two degrees of freedom relative to the pitch control housing;

b. a rotor blade clamp adapted to temporarily attach to the rotor blade; and c. a clamp positioner attached to the rotor blade clamp and the pitch control housing connection, adapted to pivot with two degrees of freedom relative to the rotor blade clamp, and adapted to position the rotor blade clamp a distance from the pitch control housing connection after removal of one of the blade pins, whereby the rotor blade pivots about the other pin.

2. The mechanism of claim 1, wherein the clamp positioner comprises:

a. a threaded stud with an end rotatably attached to the pitch control housing connection; and b. a female knuckle engaged with said threaded stud and attached to the rotor blade clamp such that the rotor blade clamp moves relative to the threaded stud end upon rotation of the threaded stud.

3. The mechanism of claim 2, wherein the threaded stud end of the clamp positioner is adapted to engage a device for rotating the threaded stud.

4. The mechanism of claim 2, wherein the clamp positioner comprises:

a. a pivotal element rotatably attached to the female knuckle and adapted to pivot in an axis other than an axis of the threaded stud; and b. a removable pin adapted to pivotally secure the rotor blade clamp to the pivotal element and to enable the rotor blade clamp to pivot about an axis other than the pivotal element axis, whereby the rotor blade clamp pivots with two degrees of freedom relative to the threaded stud.

5. The mechanism of claim 1, wherein the pitch control housing connection comprises:
   a. a spindle adapted to pivotally attach to a member extending from the pitch control housing and pivot in a spindle axis; and
   b. a connection fitting pivotally attached to the spindle and adapted to pivot about a fitting axis that is different than the spindle axis, whereby the pitch control housing connection pivots with two degrees of freedom relative to the pitch control housing.

6. The mechanism of claim 5, wherein the pitch control housing connection further comprises a bearing housing attached to the connection fitting and adapted to have at least a portion of the clamp positioner rotate therein.

7. The mechanism of claim 1, wherein the rotor blade clamp comprises a first member pivotally attached to a second member and adapted such that the rotor blade is disposed between the first and second members when the rotor blade clamp is attached to the rotor blade.

8. The mechanism of claim 7, wherein the first and second members are adapted to be temporarily statically secured together.

9. The mechanism of claim 8, wherein the first and second members each have a hole adapted to be aligned and accept a clamp pin whereby the first and second member are temporarily statically secured together.

10. A blade folding assembly for folding a helicopter blade attached to a pitch control housing with first and second pins, said assembly comprising:
   a. clamping means for removably coupling said blade folding assembly to the blade;
   b. positioning means for controllably pivoting the blade about the first pin when the second pin is removed, said positioning means being attached to said clamping means; and
   c. attaching means for removably coupling said blade folding assembly to said pitch control housing, said attaching means being attached to said positioning means.

11. The assembly of claim 10, wherein said clamping means further comprises first pivoting means for enabling said clamping means to pivot about said positioning means with two degrees of freedom.

12. The assembly of claim 10, wherein said attaching means further comprising second pivoting means for enabling said positioning means to pivot about said pitch control housing with two degrees of freedom.

13. The assembly of claim 10, wherein said positioning means further comprises controlling means for controlling the position of the blade and the speed of pivoting the blade.

14. The assembly of claim 13, wherein said controlling means comprises rotatable means for controlling the position of the blade and the speed of pivoting the blade with a hand tool or power tool.

15. A process for folding a helicopter rotor blade attached to a pitch control housing via first and second pins extending therethrough, comprising the steps of:
   a. clamping a rotor blade clamp of a rotor blade positioning mechanism to the blade;
   b. pivotally attaching a pitch control housing connection of the rotor blade positioning mechanism to the pitch control housing;
   c. pivotally attaching the rotor blade clamp to a clamp positioner of the rotor blade positioning mechanism;
   d. removing the first pin; and
   e. adjusting the clamp positioner such that the rotor blade clamp moves relative to the pitch control housing connection, whereby the rotor blade pivots about the second pin thereby folding the blade.

16. The process of claim 15, further comprising the steps of:
   a. moving the pitch control housing connection with two degrees of freedom relative to the pitch control housing; and
   b. moving the rotor blade clamp with two degrees of freedom relative to the clamp positioner.

17. The process of claim 15, wherein the adjusting the clamp positioner step further comprises the steps of rotating a threaded stud of the clamp positioner whereby a female knuckle engaged with threaded stud moves axially along the threaded stud, the female knuckle being in connection with and affecting movement of the rotor blade clamp relative to the pitch control housing.

18. The process of claim 15, further comprising the steps of:
   a. readjusting the clamp positioner such that a hole in the blade realigns with a hole in the pitch control housing;
   b. inserting the first pin through the aligned holes in the blade and the pitch control housing thereby fixedly resecuring the blade to the pitch control housing; and
   c. removing the rotor blade clamp and the pitch control housing mechanism from the blade and the pitch control housing respectively.

19. The process of claim 15, further comprising the steps of:
   a. attaching a pole to a tip of the blade; and
   b. supporting the blade with the pole as the blade pivots about the second pin.

* * * * *